US011109385B2

United States Patent
Kim et al.

(10) Patent No.: US 11,109,385 B2
(45) Date of Patent: *Aug. 31, 2021

(54) METHOD AND APPARATUS FOR MEASURING DOWNLINK INTERFERENCE IN OFDM MOBILE COMMUNICATION SYSTEM

(71) Applicant: Samsung Electronics Co., Ltd., Gyeonggi-do (KR)

(72) Inventors: Younsun Kim, Gyeonggi-do (KR); Kiil Kim, Gyeonggi-do (KR); Hyojin Lee, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/017,496

(22) Filed: Jun. 25, 2018

(65) Prior Publication Data

US 2018/0310318 A1    Oct. 25, 2018

Related U.S. Application Data

(63) Continuation of application No. 13/532,115, filed on Jun. 25, 2012, now Pat. No. 10,009,903.

(30) Foreign Application Priority Data

Jun. 24, 2011 (KR) .................... 10-2011-0061454

(51) Int. Cl.
*H04W 72/08* (2009.01)
*H04B 17/318* (2015.01)
(Continued)

(52) U.S. Cl.
CPC ........ *H04W 72/082* (2013.01); *H04B 17/318* (2015.01); *H04B 17/336* (2015.01);
(Continued)

(58) Field of Classification Search
CPC ............ H04L 5/0035; H04W 72/0406; H04W 72/0446; H04W 72/082; H04W 74/002
See application file for complete search history.

(56) References Cited

U.S. PATENT DOCUMENTS 8,886,250 B2    11/2014 Barbieri
9,137,747 B2 *  9/2015 Park .................... H04W 24/02
(Continued)

FOREIGN PATENT DOCUMENTS

CN    101867457    10/2010
CN    102017763    4/2011
(Continued)

OTHER PUBLICATIONS

Renesas Mobile Europe Ltd., "Correction on Overlapping Non-Zero-Power and Zero-Power CSI-RS Configurations", R1-111559, 3GPP TSG-RAN WG1 Meeting #65, May 9-13, 2011, 5 pages.
(Continued)

*Primary Examiner* — Mansour Oveissi
(74) *Attorney, Agent, or Firm* — The Farrell Law Firm, P.C.

(57) ABSTRACT

A method of a base station in a wireless communication system, a method of a terminal, a base station, and a terminal are provided. The method of the base station includes transmitting configuration information on measuring a channel state, wherein the configuration information includes first information on a first resource for a channel measurement and second information on a second resource for an interference measurement; transmitting a channel state information reference signal (CSI-RS) associated with the first resource; and receiving channel state information based on the first resource and the second resource, and wherein the second resource is a resource for muting data transmission, and wherein the second resource is one of resources for
(Continued)

muting data transmission which are configured to a user equipment (UE).

16 Claims, 11 Drawing Sheets

(51) Int. Cl.
| | | |
|---|---|---|
| *H04B 17/336* | (2015.01) | |
| *H04J 11/00* | (2006.01) | |
| *H04B 17/24* | (2015.01) | |
| *H04B 17/345* | (2015.01) | |
| *H04W 88/08* | (2009.01) | |
| *H04L 5/00* | (2006.01) | |
| *H04B 7/022* | (2017.01) | |

(52) U.S. Cl.
CPC ......... *H04J 11/005* (2013.01); *H04J 11/0026* (2013.01); *H04B 7/022* (2013.01); *H04B 17/24* (2015.01); *H04B 17/345* (2015.01); *H04L 5/0048* (2013.01); *H04L 5/0073* (2013.01); *H04W 88/085* (2013.01); *Y02D 30/70* (2020.08)

(56) References Cited

U.S. PATENT DOCUMENTS

| | | | |
|---|---|---|---|
| 2009/0303900 | A1 | 12/2009 | Cho et al. |
| 2010/0099428 | A1 | 4/2010 | Bhushan et al. |
| 2010/0103906 | A1 | 4/2010 | Montojo et al. |
| 2010/0273514 | A1 | 10/2010 | Koo et al. |
| 2011/0149894 | A1 | 6/2011 | Luo et al. |
| 2011/0199986 | A1* | 8/2011 | Fong ............... H04L 5/0035 370/329 |
| 2011/0235743 | A1 | 9/2011 | Lee, II |
| 2011/0252139 | A1* | 10/2011 | Bhattad ............. H04L 1/0013 709/226 |
| 2011/0317581 | A1 | 12/2011 | Hoshino et al. |
| 2012/0010637 | A1 | 1/2012 | Stopek et al. |
| 2012/0021753 | A1 | 1/2012 | Damnjanovic et al. |
| 2012/0106374 | A1 | 5/2012 | Gaal |
| 2012/0207105 | A1 | 8/2012 | Geirhofer et al. |
| 2012/0208541 | A1 | 8/2012 | Luo et al. |
| 2012/0213261 | A1 | 8/2012 | Sayana |
| 2012/0220327 | A1* | 8/2012 | Lee, II ............. H04W 72/1273 455/509 |
| 2012/0236741 | A1 | 9/2012 | Xu et al. |
| 2012/0257515 | A1 | 10/2012 | Hugl et al. |
| 2012/0281554 | A1* | 11/2012 | Gao ................. H04L 5/0053 370/252 |
| 2012/0315859 | A1 | 12/2012 | Lee, II |
| 2013/0028182 | A1 | 1/2013 | Geirhofer et al. |
| 2013/0114428 | A1 | 5/2013 | Koivisto |
| 2013/0148533 | A1 | 6/2013 | Li et al. |
| 2013/0208677 | A1 | 8/2013 | Lee et al. |
| 2014/0036713 | A1 | 2/2014 | Hugl et al. |
| 2014/0105055 | A1 | 4/2014 | Kang et al. |
| 2016/0164590 | A1 | 6/2016 | Noh et al. |

FOREIGN PATENT DOCUMENTS

| | | |
|---|---|---|
| JP | 2014-510464 | 4/2014 |
| JP | 2014-512713 | 5/2014 |
| JP | 2014-514837 | 6/2014 |
| RU | 2 364 046 | 8/2009 |
| WO | WO 2008/057898 | 5/2008 |
| WO | WO 2010/064842 | 6/2010 |
| WO | WO 2010/106729 | 9/2010 |
| WO | WO 2011/013989 | 2/2011 |
| WO | WO 2011/046326 | 4/2011 |
| WO | WO 2011/105726 | 9/2011 |
| WO | WO 2012/108945 | 8/2012 |
| WO | WO 2012/136846 | 10/2012 |

OTHER PUBLICATIONS

Rapporteur (Samsung), Miscellaneous Corrections (related to review in preparation for ASN.1 freeze), R2-113641, 3GPP TSG-RAN2 Meeting #74, May 9-13, 2011, 3 pages.
Ericsson, ST-Ericsson, "Views on CSI RS Muting", R1-103843, 3GPP TSG-RAN WG1 #61bis, Jun. 28-Jul. 2, 2010, 3 pages.
Japanese Office Action dated Dec. 19, 2016 issued in counterpart application No. 2014-516922, 9 pages.
Bruno Clerckx et al., "Explicit vs. Implicit Feedback for SU and MU-MIMO", 2010 IEEE Global Telecommunications Conference, Dec. 10, 2010.
Ericsson, ST-Ericsson, "Aspects on Distributed RRUs with Shared Cell-ID for Heterogeneous Deployments", R1-110649, 3GPP TSG-RAN WG1 #64, Feb. 21-25, 2011, 11 pages.
LG Electronics, "Remaining Issues on CSI-RS", R1-111702, 3GPP TSG RAN WG1 Meeting #65, May 9-13, 2011, 5 pages.
Japanese Reexamination Report dated Mar. 30, 2018 issued in counterpart application No. 2014-516922, 4 pages.
Russian Office Action dated Feb. 16, 2017 issued in counterpart application No. 2013139299/07, 16 pages.
Chinese Office Action dated Mar. 16, 2017 issued in counterpart application No. 201280031283.5, 11 pages.
Huawei, HiSilicon, "Discussion on the Operation and Performance of CoMP in Scenarios 3 and 4", R1-111250, 3GPP TSG RAN WG1 Meeting #65, May 9-13, 2011, 5 pages.
Fujitsu, "Email Discussion [69-11]: FFS Aspects of aperiodic CSI Feedback for CoMP", R1-122931, 3GPP TSG RAN WG1 Meeting #69, May 21-25, 2012, 22 pages.
Japanese Office Action dated Apr. 18, 2016 issued in counterpart application No. 2014-516922, 4 pages.
Catt, "Interference Measurement over Muted RE", R1-110049, 3GPP TSG RAN WG1 Meeting #63bis, Jan. 17-21, 2011.
Ericsson, ST-Ericsson, "Further Details on CSI RS Configuration", R1-105322, 3GPP TSG-RAN WG1 #62bis, Oct. 11-15, 2010.
European Search Report dated Feb. 17, 2015 issued in counterpart application No. 12801975.9-1855.
Indian Office Action dated Nov. 26, 2018 issued in counterpart application No. 2455/KOLNP/2013, 7 pages.
3rd Generation Partnership Project; Technical Specification Group Radio Access Network; Evolved Universal Terrestrial Radio Access (E-UTRA); Radio Resource Control (RRC);. Protocol Specification (Release 10), 3GPP TS 36.331 V10.1.0, Mar. 2011, 7 pages.
Japanese Office Action dated Mar. 11, 2019 issued in counterpart application No. 2018-004286, 9 pages.
European Search Report dated Jul. 23, 2019 issued in counterpart application No. 12801975.9-1219, 7 pages.
Canadian Office Action dated Oct. 22, 2019 issued in counterpart application No. 2,831,028, 6 pages.
Brazilian Office Action dated Apr. 2, 2020 issued in counterpart application No. 112013033312-0, 7 pages.
Canadian Office Action dated Nov. 4, 2020 issued in counterpart application No. 2,831,028, 6 pages.
LG Electronics, "Discussions on CSI Feedback Enhancement", R1-111788, 3GPP TSG RAN WG1 Meeting #65, May 9-13, 2011, 5 pages.
Research in Motion, UK Limited, "Downlink CSI Feedback for Low-Power Nodes", R1-111662, 3GPP TSG RAN WG1 Meeting #65, May 9-13, 2011, 6 pages.
European Search Report dated May 12, 2021 issued in counterpart application No. 21155924.0-1205, 11 pages.

* cited by examiner

METHOD AND APPARATUS FOR MEASURING DOWNLINK INTERFERENCE IN OFDM MOBILE COMMUNICATION SYSTEM

PRIORITY

This continuation application claims priority under 35 U.S.C. § 120 to U.S. patent application Ser. No. 13/532,115, filed on Jun. 25, 2012, which claims priority under 35 U.S.C. § 119(a) to Korean Patent Application Serial No. 10-2011-0061454, which was filed in the Korean Intellectual Property Office on Jun. 24, 2011, the contents of each of which is incorporated herein by reference.

BACKGROUND OF THE INVENTION

1. Field of the Invention

The present invention relates generally to an interference measurement method of a terminal for facilitating downlink transmission in a mobile communication system composed of a plurality of base stations.

2. Description of the Related Art

The mobile communication system has evolved into a high-speed, high-quality wireless packet data communication system providing data and multimedia services beyond simply voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the newer services. Particularly, LTE is a most promising technology that is capable of facilitating the high speed packet data transmission and maximizing the throughput of the radio communication system with various radio access technologies. LTE-A is the evolved version of LTE, and seeks to improve data transmission capability.

Typically, LTE devices denote 3GPP releases 8 and 9 evolved Node B (eNB) and User Equipment (UE), and LTE-A devices denote 3GPP release 10 eNB and UE. The 3GPP standard organization is working on the next release of the standard to secure improved performance of the LTE-A standard.

A cellular radio communication system is implemented with a plurality of cells deployed within a limited area. Each cell is centered around a base station facility responsible for mobile communication of the UEs within the cell area. The base station facility includes antennas for transmitting radio signals and a signal processing part to provide the UEs with mobile communication service within the cell. Such an antenna system in which the antennas are located at the center of the cell is referred to as Centralized Antenna System (CAS), and the conventional mobile communication systems are implemented in the form of CAS. Distributed Antenna System (DAS) is the antenna system opposite to CAS in that the antennas are distributed evenly within the cell service area to improve the mobile communication service.

However, the conventional art lacks a method of measuring interference between the eNB and UE efficiently in the DAS-based mobile communication system.

SUMMARY OF THE INVENTION

The present invention has been made in an effort to solve the above problem and it is an object of the present invention to provide a method and apparatus for measuring downlink interference efficiently in a DAS-based LTE-A system.

In accordance with an aspect of the present invention, a method of a base station in a wireless communication system is provided. The method includes transmitting configuration information on measuring a channel state, wherein the configuration information includes first information on a first resource for a channel measurement and second information on a second resource for an interference measurement; transmitting a channel state information reference signal (CSI-RS) associated with the first resource; and receiving channel state information based on the first resource and the second resource, and wherein the second resource is a resource for muting data transmission, and wherein the second resource is one of resources for muting data transmission which are configured to a user equipment (UE).

In accordance with another aspect of the present invention, a method of a terminal in a wireless communication system is provided. The method includes receiving configuration information on measuring a channel state, the configuration information includes first information on a first resource for a channel measurement and second information on a second resource for an interference measurement; receiving a CSI-RS associated with the first resource; generating channel state information based on a channel measured on the first resource and an interference measured on the second resource; and transmitting the generated channel state information, and wherein the second resource is a resource for muting data transmission, and wherein the second resource is one of resources for muting data transmission which are configured to a UE.

In accordance with another aspect of the present invention, a base station in a wireless communication system is provided. The base station includes a transceiver; and a controller coupled with the transceiver and configured to control to transmit configuration information on measuring a channel state, wherein the configuration information includes first information on a first resource for a channel measurement and second information on a second resource for an interference measurement, transmit a CSI-RS associated with the first resource, and receive channel state information based on the first resource and the second resource, wherein the second resource is a resource for muting data transmission, and wherein the second resource is one of resources for muting data transmission which are configured to a UE.

In accordance with another aspect of the present invention, a terminal in a wireless communication system is provided. The terminal includes a transceiver; and a controller coupled with the transceiver and configured to control to receive configuration information on measuring a channel state, the configuration information includes first information on a first resource for a channel measurement and second information on a second resource for an interference measurement, receive a CSI-RS associated with the first resource, generate channel state information based on a channel measured on the first resource and an interference measured on the second resource, and transmit the generated channel state information, wherein the second resource is a resource for muting data transmission, and wherein the second resource is one of resources for muting data transmission which are configured to a UE.

BRIEF DESCRIPTION OF THE DRAWINGS

The above and other aspects, advantages, and features of certain embodiments of the present invention will become apparent to those skilled in the art from the following detailed description taken in conjunction with the accompanying drawings, in which.

DETAILED DESCRIPTION OF EMBODIMENTS OF THE INVENTION

Figure 1:
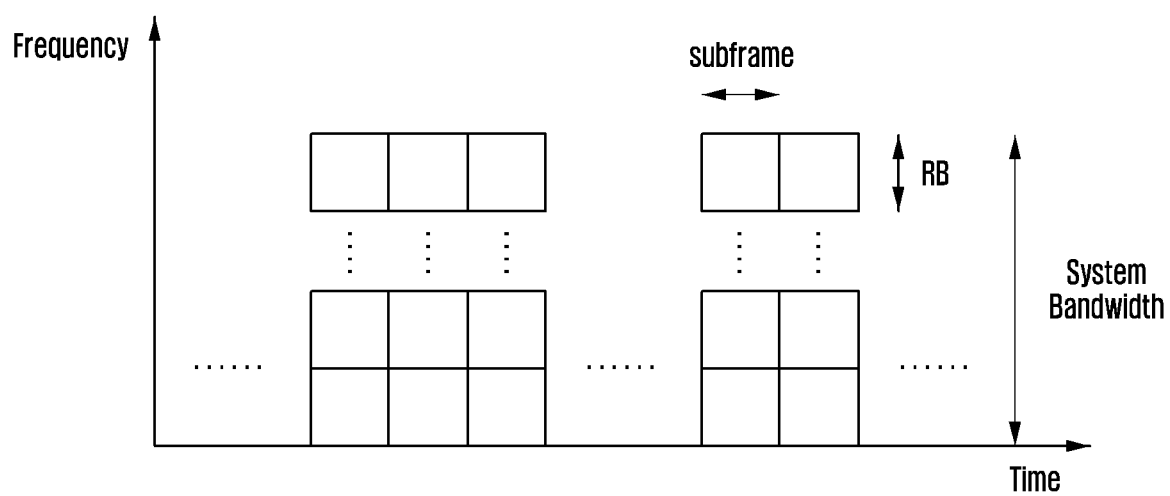
FIG. 1 illustrates a time-frequency resource structure of LTE/LTE-A.

Embodiments of the present invention are described in detail with reference to the accompanying drawings. The same reference numbers are used throughout the drawings to refer to the same or like parts. Detailed descriptions of well-known functions and structures incorporated herein may be omitted for the sake of clarity and conciseness.

Although a detailed description of the present invention is given herein with reference to the OFDM-based radio communication system, particularly 3GPP E-UTRA standard system, it will be understood by those skilled in the art that the present invention can be applied even to other communication systems having the similar technical background and channel format, with a slight modification, without departing from the spirit and scope of the present invention.

The existing $3^{rd}$ generation wireless packet data communication system, such as HSDPA, HSUPA and HRPD, uses technologies such as Adaptive Modulation and Coding (AMC) and Channel-Sensitive Scheduling to improve the transmission efficiency. With the use of AMC, a transmitter can adjust a data transmission amount according to the channel state. That is, when the channel state is "Poor", the transmitter reduces the data transmission amount to match the reception error probability to a desired level, and when the channel state is "Good", the transmitter increases the data transmission amount to transmit a large volume of information efficiently while matching the reception error probability to the desired level.

Using the channel-sensitive scheduling resource management method, since the transmitter selectively services a user having a superior channel state among several users, the system capacity is increased as compared with a transmitter that allocates a channel to one user and services the user with the allocated channel. Such capacity increase is commonly referred to as a multi-user diversity gain. In brief, the AMC method and the channel-sensitive scheduling method are methods for receiving partial channel state information being fed back from a receiver, and applying an appropriate modulation and coding technique at the most efficient time determined depending on the received partial channel state information.

When using AMC along with the Multiple Input Multiple Output (MIMO) transmission scheme, it may be necessary to consider a number of spatial layers and ranks for transmitting signals. In this case, the transmitter determines the optimal data rate in consideration of the number of layers for use in MIMO transmission.

Recently, substantial research has been conducted to replace Code Division Multiple Access (CDMA) used in the legacy $2^{nd}$ and $3^{rd}$ mobile communication systems with OFDMA for the next generation mobile communication system. The 3GPP and 3GPP2 are concurrent with the standardization of the OFDMA-based evolved system. OFDMA is expected to provide superior system throughput as compared to the CDMA. One of the main factors that allow OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

FIG. 1 illustrates a time-frequency resource structure of LTE/LTE-A.

Referring to FIG. 1, the radio resource for transmission from an eNB to a UE is divided into Resource Blocks (RBs) in the frequency domain and divided into subframes in the time domain. An RB is formed by 12 subcarriers and has a bandwidth of 180 kHz. A subframe consists of 14 OFDM symbols in a normal Cyclic Prefix (CP) and has a time duration of 1 msec. The LTE/LTE-A system is capable of allocating resources in units of subframe in the time domain and in units of RB in the frequency domain.

Figure 2:
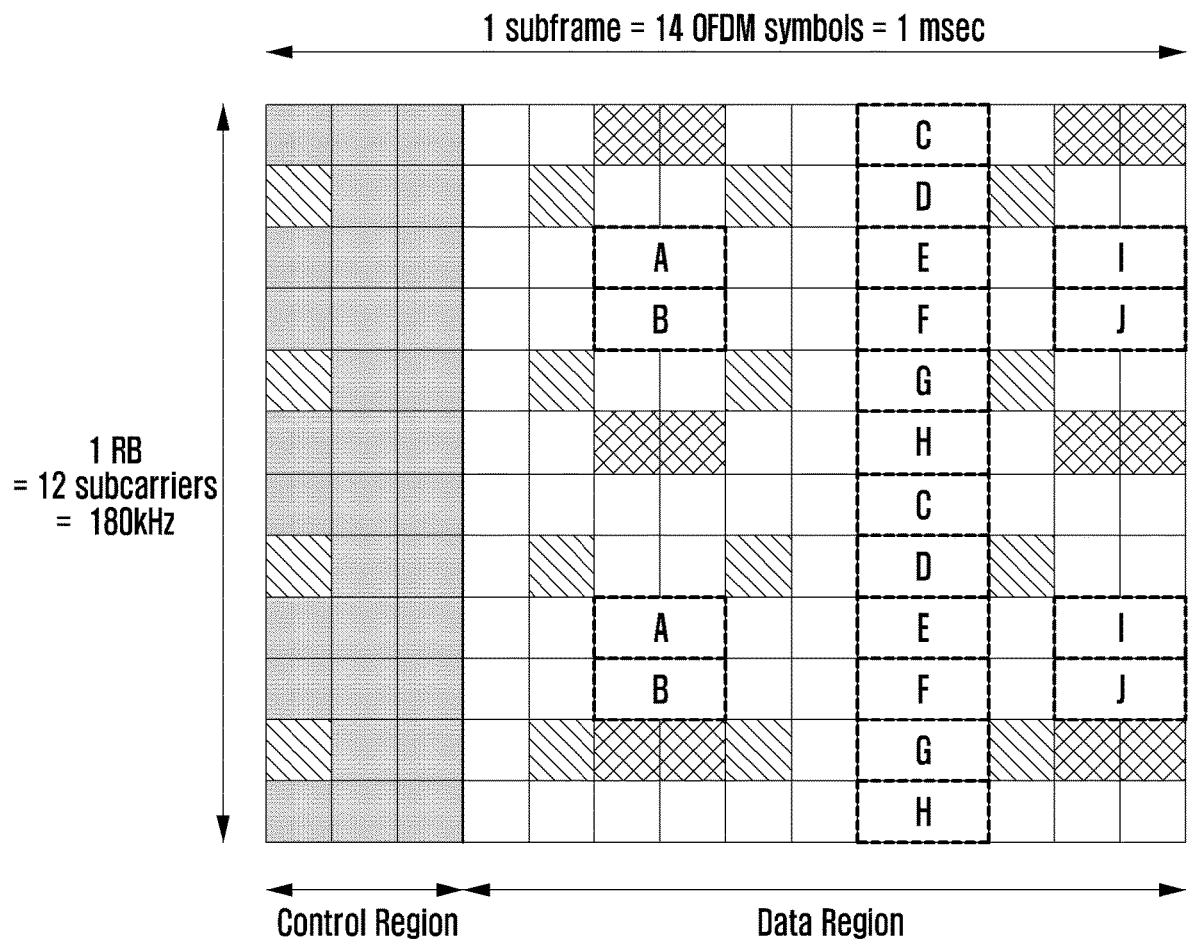
FIG. 2 illustrates the structure of an RB and subframe as the minimum downlink scheduling unit in the LTE/LTE-A system.

FIG. 2 illustrates the structure of an RB and subframe as the minimum downlink scheduling unit in the LTE/LTE-A system.

As shown in FIG. 2, the radio resource is defined by one subframe in the time domain and one RB in the frequency domain. Each RB consists of 12 subcarriers in the frequency domain and 14 OFDM symbols, resulting in a total 168 frequency-time resource positions. In LTE/LTE-A, each resource position is referred to as Resource Element (RE).

As shown in FIG. 2, an RB may be configured with a plurality of different types of signals as follows.

1. Cell Specific RS (CRS): Reference signal transmitted to be received by all UEs within a cell.
2. Demodulation Reference Signal (DRS): Reference signal transmitted to a specific UE.
3. Physical Downlink Shared Channel (PDSCH): Downlink data channel carrying traffic from an eNB to a UE with REs in the data region (see FIG. 2) with the exception of the REs occupied by reference signals.

4. Channel Status Information Reference Signal (CSI-RS): Reference signal transmitted to the UEs located within a cell for measurement of channel status. A plurality of CSI-RSs may be transmitted in a cell.
5. Other control channels (PHICH, PCFICH, PDCCH): Control signals carrying the control information required for receipt of PDSCH and HARQ ACKnowledgement/Non-ACK (ACK/NACK) corresponding to uplink data transmission.

In the LTE-A system, the CSI-RS of other eNBs may be muted so as to reduce the interference to the CSI-RS transmission of the corresponding eNB. A muted CSI-RS can be configured at the potential CSI-RS positions, and the UE skips the radio resource to receive a traffic signal. In the LTE-A system, the muted CSI-RS is also referred to as zero-power CSI-RS, since there is no transmittance on the corresponding resource elements.

In FIG. 2, the CSI-RS may be transmitted on some of the positions denoted by alphabets A, B, C, D, E, F, G, H, I, and J. The muted CSI-RS can be configured on some of the positions A, B, C, D, E, F, G, H, I, and J. The CSI-RS can be transmitted on 2, 4, or 8 REs according to the number of antenna ports. When using two antenna ports, half of positions of the pattern of FIG. 2 are used for CSI-RS transmission. When four antenna ports are used, all of the positions of a specific pattern are used for CSI-RS transmission. When using eight antenna ports, two patterns are used for CSI-RS transmission. However, CSI-RS muting is always configured in units of pattern. That is, the CSI-RS muting can be applied to multiple patterns but partially in each pattern without overlapping of the CSI-RS positions. When the CSI-RS and muting positions are overlapped with each other, CSI-RS muting is applied to the part of one pattern where CSI-RS transmission is not configured.

In the cellular system, reference signals are transmitted for measurement of downlink channel status. In the 3GPP LTE-A system, the UE measures channel status between UE and eNB using CSI-RS transmitted by the eNB. The channel status is measured in consideration of a few elements including downlink interference amount. The downlink interference amount includes interference signals occurred by the antennas of neighbor eNBs and thermal noise, which are important for the UE's downlink channel status measurement.

In a transmission from an eNB having one transmit antenna to a UE having one receive antenna, the UE has to determine Es/Io (Symbol Energy to Interference Ratio) based on the energy per symbol receivable in the downlink and the interference amount to be received simultaneously for the corresponding symbol reception duration based on the reference signal transmitted by the eNB. The determined Es/Io is reported to the eNB such that the eNB can determine the data rate for transmission to the UE in the downlink.

In a normal mobile communication system, the eNB facilities are located at the center of the corresponding cell to communicate with the UEs using one or more antennas arranged at the restricted area. Such a system designed with the antennas arranged at the same place within a cell is referred to as Centralized Antenna System (CAS). In contrast, the system designed with the antennas (Remote Radio Head or RRH) are distributed within the cell, and is referred to Distributed Antenna System (DAS).

Figure 3:
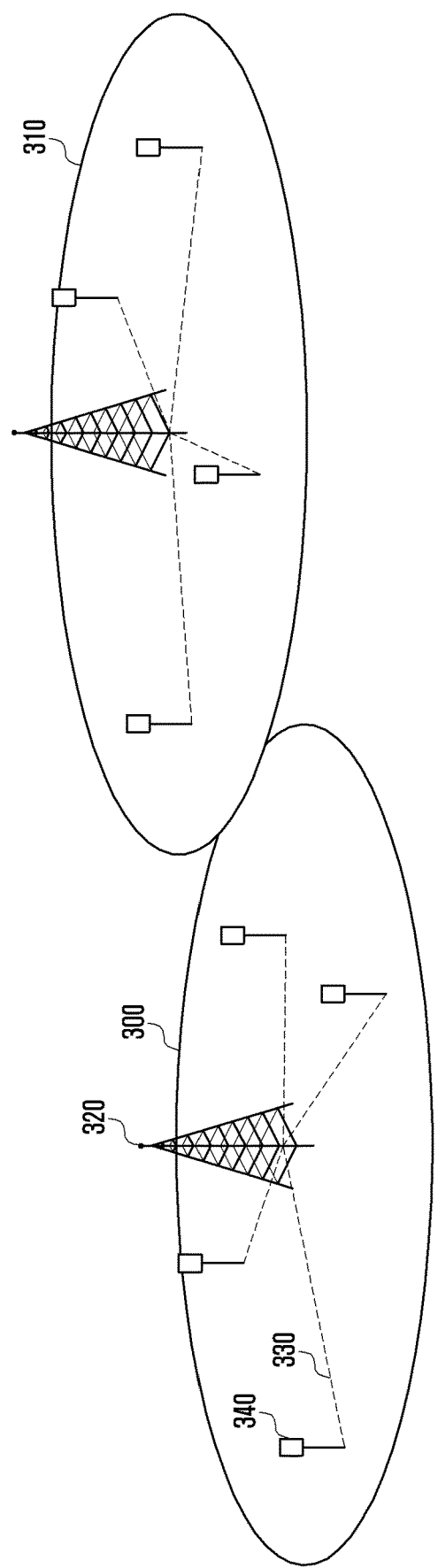
FIG. 3 illustrates an antenna arrangement in a conventional distributed antenna system.

FIG. 3 illustrates an antenna arrangement in a conventional distributed antenna system.

FIG. 3 is directed to a DAS-based mobile communication system composed of two cells 300 and 310. The cell 300 is composed of one high power antenna 320 and four low power antennas. The high power antenna is configured to provide the UEs with at least minimum level service across the entire cell while the low power antennas are configured to provide the service with specific UEs at a high data rate within a restricted area of the cell. The low power antennas and the high power antenna 330 are connected to the central controller so as to operate according to the scheduling and radio resource allocation of the central controller. In the DAS-based communication system, one or more distributed antennas can be displayed at a geographically separated antenna position. In the DAS-based communication system, a set of the antennas located at the same position is referred to as antenna group (RRH group).

In the DAS-based communication system as shown in FIG. 3, the UE receives the signal through an RRH group separated geographically and regards the signal transmitted through the remaining RRH groups as interference.

Figure 4:
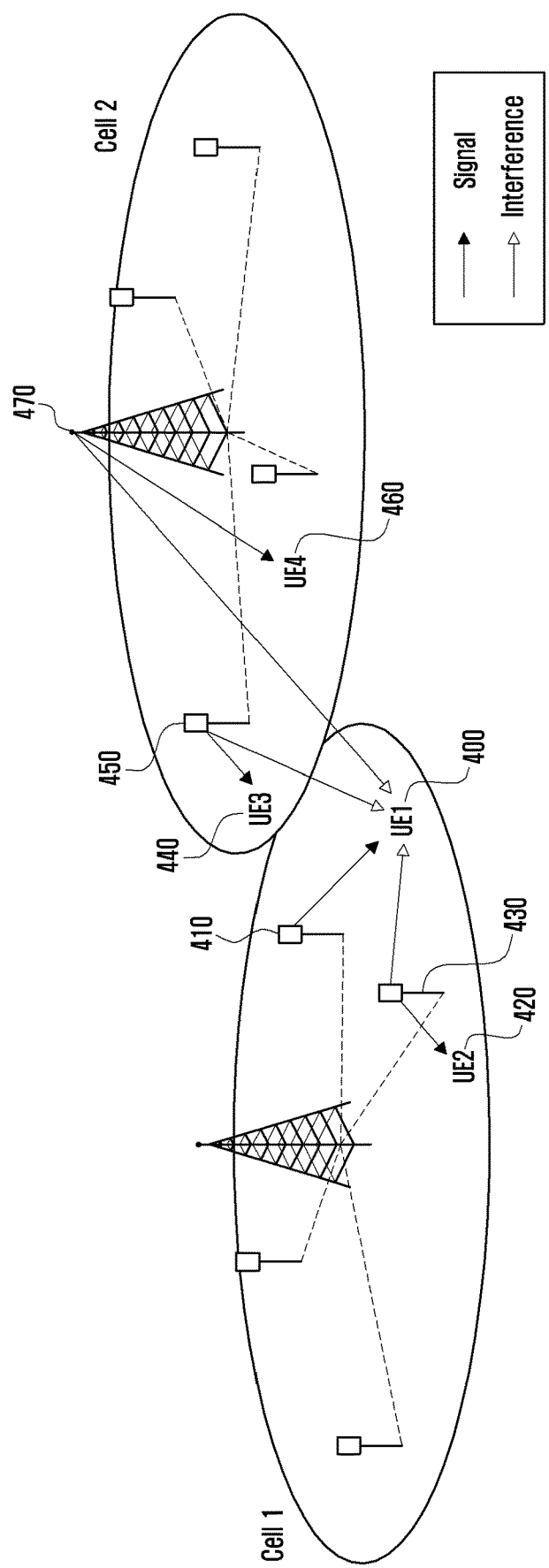
FIG. 4 illustrates interference among the transmissions to different UEs through different RRH groups in the DRS-based communication system according to an embodiment of the present invention.

FIG. 4 illustrates interference among the transmissions to different UEs through different RRH groups in the DRS-based communication system according to an embodiment of the present invention.

In FIG. 4, the UE1 receives traffic signals through the RRH group 410, the UE2 does so through the RRH group 430, UE3 does so through RRH group 450, and UE4 does so through the RRH group 470. While the UE1 is receiving the to traffic signal through the RRH group 410, the traffic signals transmitted to the other UEs through other RRH groups act as interferences. That is, the signals transmitted through the RRH groups 430, 450, and 470 act as the interference to the signal transmitted to the UE1 through the RRH group 410.

Typically, two types of interferences can be considered in the DAS-based communication system.
1. Inter-cell interference: Interference caused by RRH groups of other cells.
2. Intra-cell interference: Interference caused by RRH groups of the same cell.

In FIG. 4, the UE1 experiences intra-cell interference caused by the RRH group 430 of the same cell and inter-cell interference caused by the RRH groups 450 and 470 of a neighbor cell. Both the inter-cell and intra-cell interferences disturb the data channel reception of the UE.

In order for the UE to receive signals at an optimal data rate in the downlink of the DAS-based communication system, it is necessary to measure the inter-cell interference and intra-cell interference exactly and compare the measurement results with the received signal strength to request the eNB for the optional data rate.

Unlike the DAS-based communication system, the legacy CAS-based communication system has only one RRH group per cell. In this case, it is possible to only consider the inter-cell interference. When configuring the LTE/LTE-A system on the basis of CAS, the inter-cell interference can be measured with the CRS described above with reference to FIG. 2. In the CAS-based communication system, the UE typically receives the CRS and then converts the CRS having periodic characteristic in the frequency domain into a delay domain signal using Inverse Fast Fourier Transform (IFFT).

Figure 5:
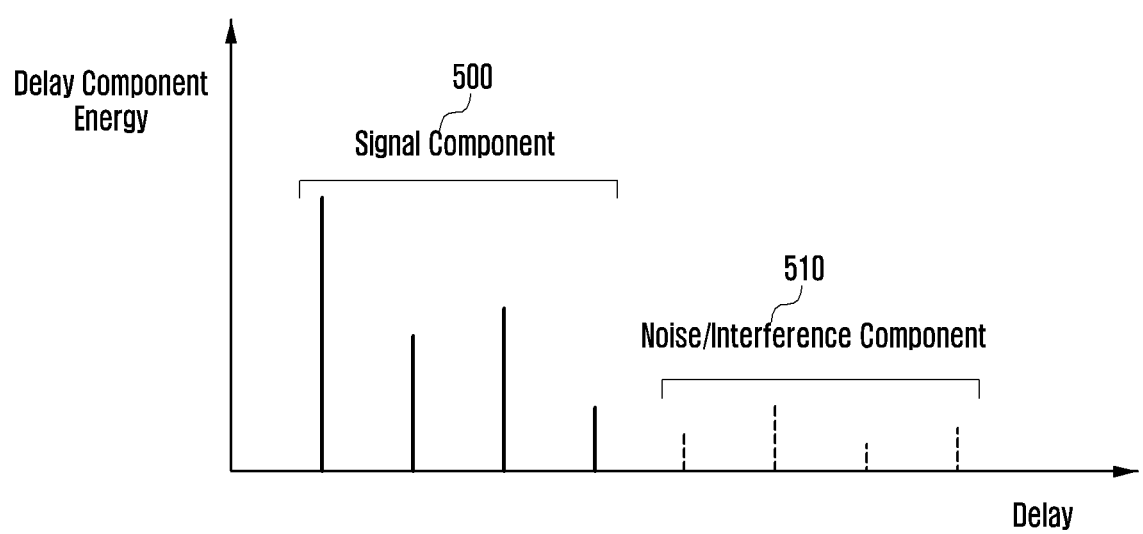
FIG. 5 illustrates the Cell Specific RS (CRS) converted to a delay domain signal in the method according to an embodiment of the present invention.

FIG. 5 illustrates the CRS converted to a delay domain signal in a method according to an embodiment of the present invention.

In the LTE/LTE-A system, if IFFT is performed to convert the signal to the delay domain, it is possible to obtain the channel impulse response characterized in that the energy carried by the delay component decreases as the delay increases. As shown in FIG. 5, the rear part of the signal 510 obtained through IFFT corresponds to the interference caused by other cells while the front part of the signal 500 corresponds to the actual CRS component. In this case, the UE can calculate the signal-to-noise ratio by measuring the size of the interference at the rear part of the signal 510. The interference measurement is possible because different cells do not transmit the same CRS. The different cells can transmit the CRS using different frequency-time resources, and such a measurement scheme can be used because unique scrambling is applied to the CRS in each cell. In LTE/LTE-A, the CRS scrambling is performed with a Cell ID of the corresponding cell.

In the DAS-based LTE/LTE-A system, all RRH groups existing in the same cell transmit the same CRS, and it is impossible to apply a unique scrambling code per RRH group. If the RRH groups transmitting the CRS within the same cell are not discriminated among each other, it is impossible to measure the intra-cell interference but inter-cell interference can be measured.

When measuring an interference amount with the method described with reference to FIG. 5, the UE can measure the interference caused by the RRH groups belonging to different cells but cannot measure the interference caused by the RRH groups belonging to the same cell, resulting in an inaccurate signal-to-noise ratio. This inaccuracy causes significant performance degradation of the LTE/LTE-A system adopting AMC, which determines downlink data rate in adaptation with the signal-to-noise ratio.

There is therefore a need of a method for accurately measuring the inter-cell and intra-cell interferences.

As described above, in order to accurately determine the downlink data rate in the DAS-based communication system, the UE has to be able to measure the intra-cell interference as well as inter-cell interference. To do so, the present invention discloses an interference method based on CSI-RS, and an interference method based on muting.

When measuring interference with CSI-RS, the UE measures the inter-cell interference and intra-cell interference separately and calculates the total interference amount by summing up the two measurements. In this method, the inter-cell interference is measured based on the CRS as described with reference to FIG. 5. The interference measured based on CRS includes the interference caused by the RRH groups of the neighbor cells but not the interference caused by the RRH groups of the same cell in which the UE is located.

In the CSI-RS method, the eNB notifies the UE of an interference measurement set in order for the UE to measure the intra-cell interference. The interference measurement set is a set of the RRH groups causing interference to the UE in the cell where the UE is located. In the case of FIG. 4, the UE measures inter-cell interference based on the CRS transmitted by the cell 2 and intra-cell interference based on CSI-RS transmitted by the cell 1. For this purpose, the eNB notifies the UE of the interference measurement set of the RRH groups causing intra-cell interference to the UE and the information necessary for receiving CSI-RS of the RRH groups included in the interference measurement set.

The interference measurement set of the RRH groups causing intra-cell interference to the UE and the information necessary for receiving CSI-RS of the RRH groups included in the interference measurement set are transmitted through higher layer signaling, which can be transmitted in a unicast or multicast manner. Table 1 shows the details of the information transmitted for the UE to measure the intra-cell interference according to the CSI-RS method.

TABLE 1

| RRH group | Interference Measurement Set | Information necessary for receiving CSI-RS of RRH groups include in Interference Measurement Set |
| --- | --- | --- |
| RRH1 | RRH2, RRH3, RRH4 | Information related to CSI-RS transmitted through RRH2, RRH3, and RRH4: transmission period, transmission position, number of antenna ports, etc. |
| RRH1 | RRH3, RRH4 | Information related to CSI-RS transmitted through RRH3 and RRH4: transmission period, transmission position, number of antenna ports, etc. |
| RRH2 | RRH1, RRH3, RRH4 | Information related to CSI-RS transmitted through RRH1, RRH3, and RRH4: transmission period, transmission position, number of antenna ports, etc. |
| RRH2 | RRH3, RRH4 | Information related to CSI-RS transmitted through RRH3 and RRH4: transmission period, transmission position, number of antenna ports, etc. |

The eNB can designate multiple RRH groups per UE as an interference measurement set and notify the UE of the interference measurement set and related-CSI-RS information per RRH group. Multiple receive RRH groups are dedicated for the UE to select the best receive RRH group. To do so, it is necessary to configure the interference measurement set per the receive RRH group. As shown in Table 1, each receive RRH group is configured with two interference measurement sets.

Multiple interference measurement sets are configured to taken into possibility where no data traffic is transmitted through a specific RRH group. Such turning off of transmissions occurs either to reduce the interference or because there is no data traffic to be transmitted on the RRHs. When no interference component exists in this manner, the performance may be improved by performing CSI feedback in consideration of such situation. In the RRH group RRH1, the interference measurement is configured to be performed by considering the turn-on and turn-off of the RRH group RRH2. For such a case, multiple interference measurement sets can be configured to take into account the different level of interference while CSI-RS is configured identically.

Table 1 shows that the receive RRH group is excluded from the interference measurement set, because the receive antenna group transmits the signal carrying a data channel other than interference.

Figure 6:
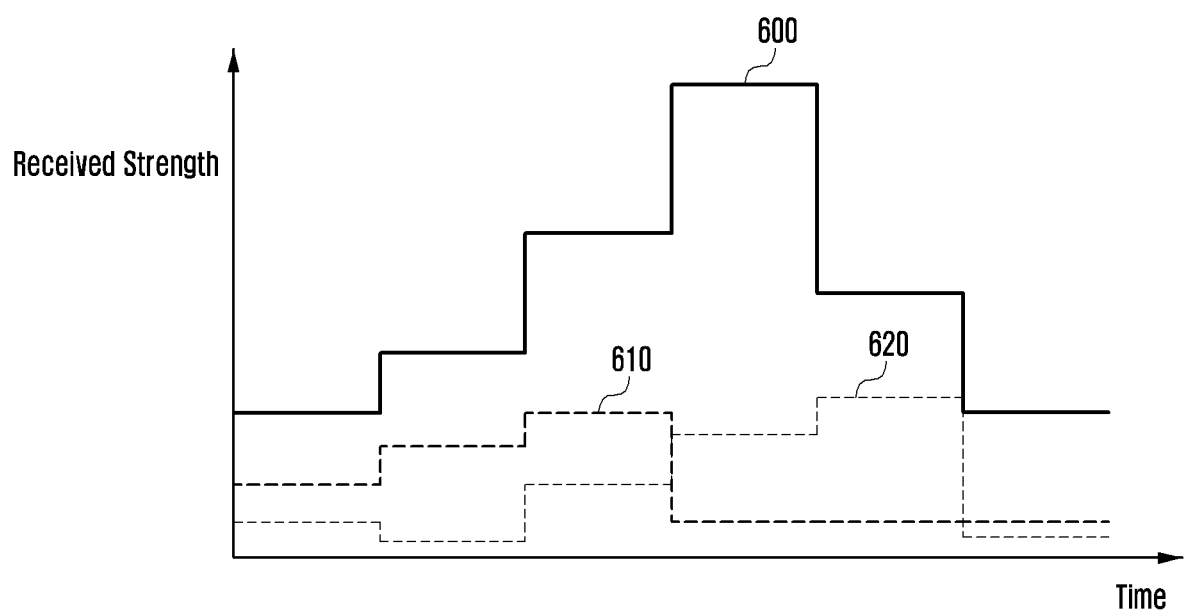
FIG. 6 illustrates variation of the received signal strength according to time under CSI-RS-based interference measurement according to an embodiment of the present invention.

FIG. 6 illustrates variation of the received signal strength according to time under the CSI-RS-based interference measurement according to an embodiment of the present invention.

In FIG. 6, reference number 600 denotes the received signal strength of CSI-RS transmitted through the RRH group included in the interference measurement set, and reference number 620 denotes the received signal strength of CSI-RS transmitted through another RRH group included in the interference measurement set. The UE can determine the intra-cell interference levels based on the CSI-RS transmitted through the antenna groups included in the interference measurement set and acquire a total interference amount by summing up the intra-cell interference with the inter-cell interference measured based on the CRS. The UE calculates the signal-to-noise ratio with the total interference amount and the received signal strength 600 of the CSI-RS transmitted through the receive RRH group and reports the signal-to-noise ratio to the eNB.

Although the description is directed to when the interference measurement set is used only for measuring intra-cell interference in the CSI-RS method, the present invention can be applied for inter-cell interference measurement. In order to accomplish this, it is necessary for the eNB to include the RRH groups of other cells in the interference measurement set and related-CSI-RS information. However, this has a drawback in that the information amount to be transmitted through higher layer signaling increases significantly.

When measuring interference with the muting method, the eNB notifies the UE of the resource on which the UE can directly measure interference. That is, the eNB allocates a specific part of the frequency-time resource for each RRH group as an interference measurement resource and mutes transmission on the corresponding resource to allow the UE to perform interference measurement.

Figure 7:
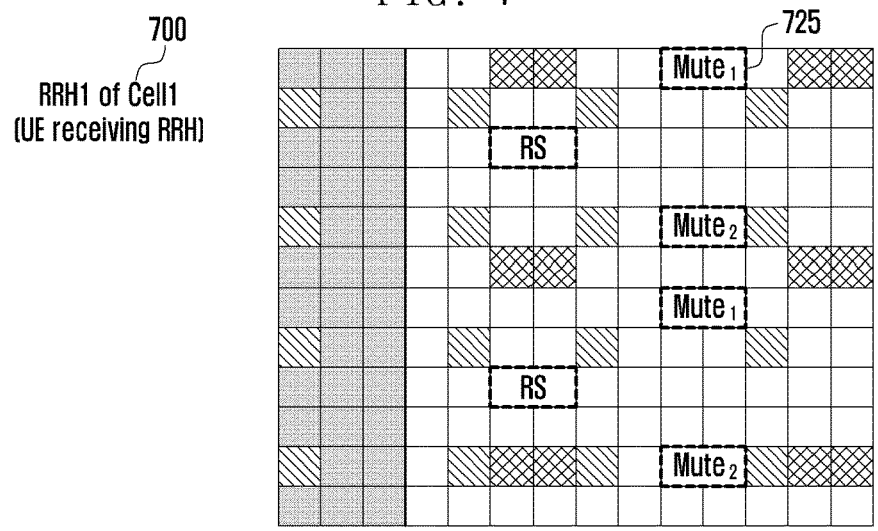
FIG. 7 illustrates a configuration of a resource block for use in the interference measurement method according to an embodiment of the present invention.
Figure 7:
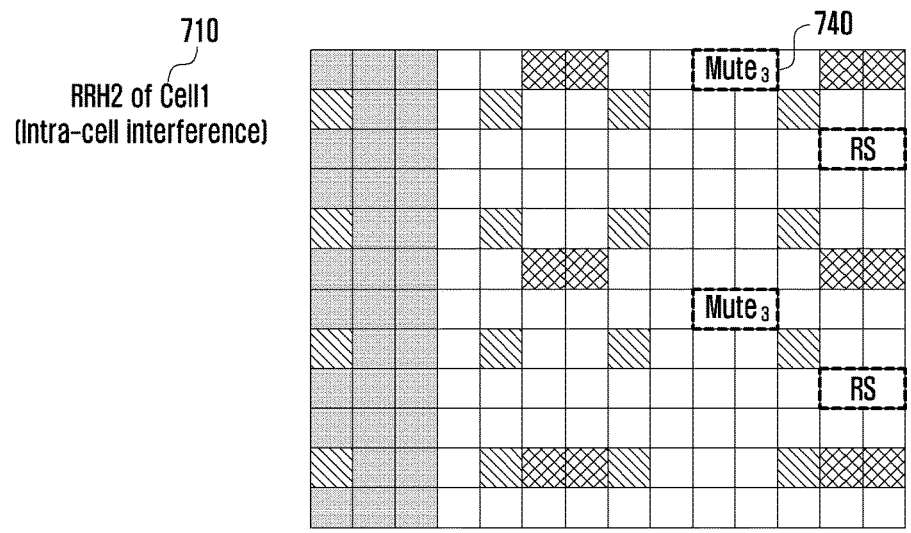
Figure 7:
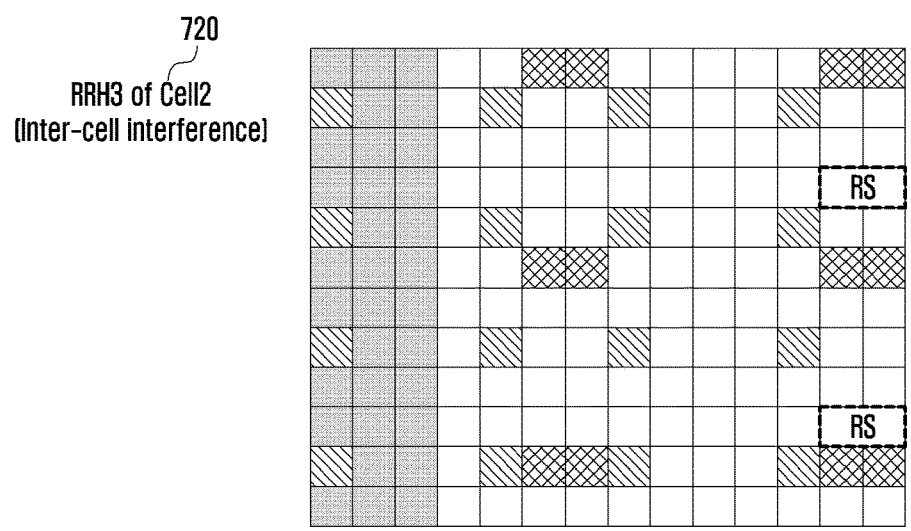

FIG. 7 illustrates a configuration of a resource block for use in the interference measurement method according to an embodiment of the present invention.

FIG. 7 is directed to when the signal is transmitted through three RRH groups. In FIG. 7, reference number 700 denotes the signal transmitted through an RRH group RRH1 which is the receive antenna group of the UE within a cell cell1. Reference number 710 denotes the signal transmitted through another RRH group RRH2 of the cell1, and reference number 720 denotes the signal transmitted through another RRH group RRH3 of another cell cell2.

The eNB allocates the radio resource corresponding to the muting patterns composed of resource elements C and G (see FIG. 2) to the UE which has the RRH1 as the receive antenna group. In FIG. 7, the resource elements mute1 denoted by reference number 725 and the resource elements mute2 denoted by reference number 730 correspond to the resource elements C and G in FIG. 2. The UE can measure the sum of intra-cell interference caused by the RRH2 and the inter-cell interference caused by the RRH3 using the muting RE mute2 730, because the corresponding REs are used by the RRH2 and RRH3 for traffic channel signal transmission.

That is, the UE measures the received signal strength on the REs denoted as RS in the signal 700 of FIG. 7 and measures the interference amount on the muting RE 730. Meanwhile, the eNB mutes transmission through the receive RRH group RRH1 on the RE 730 such that the UE accurately measures interference amount. As a result, the UE can measure the interference caused by the RRH3 with the resource 720. In order to facilitate this measurement, the transmission through RRH2 is muted as denoted by reference number 740 while the traffic channel signal is transmitted through RRH3.

In the muting method, the eNB notifies the UE of the interference measurement set for interference measurement. Unlike the CSI-RS method in which the interference measurement set is used for measurement of intra-cell interference, the eNB can use the interference measurement set in the muting method to flexibly control whether a UE measures the inter-cell interference, or the intra-cell interference, or both. Also, the interference measurement method according to the muting embodiment requires notifying of the radio resource for measurement and does not require other than information per RRH group, resulting in reduction of a higher layer signaling information amount.

In the muting method, the interference measurement set is transmitted from the eNB to the UE through higher layer signaling, which can be performed in unicast or multicast manner. Table 2 shows the details of the interference measurement-related information transmitted from the eNB to the UE according to the muting method.

TABLE 2

| RRH group | Interference Measurement Set |
|---|---|
| RRH 1 | Muting Pattern C |
| RRH 1 | Muting Pattern G |
| RRH2 | Muting Pattern E |
| RRH2 | Muting Pattern B |

As compared to Table 1, it can be observed that Table 2 has no information required for receiving the CSI-RS transmitted through a specific RRH for the UE to measure interference. Also, unlike the CSI-RS method in which the inter-cell interference is measured separately, the muting method is capable of measuring the inter-cell interference and intra-cell interference simultaneously according to the eNB's determination.

Similar to Table 1, each RRH group is configured with two interference measurement sets in Table 2. Multiple interference measurement sets are configured to allow the UE to separately perform the interference measurement for when the transmission through a specific RRH group is performed and muted. Such separate interference measurement allows the UE to report the measurement results to the eNB such that the eNB efficiently determines data rate based on the reports. The reference signal for measuring interference may be on multiple resources per RRH group but CSI-RS can be transmitted on only one resource per RRH group.

When determining the interference measurement set, it is important to ensure that the signal transmitted by the receive RRH group is not measured in the process of interference measurement. In order to avoid such situation, the present invention discloses two methods as follows:

(i) When determining the interference measurement set, the eNB configures such that the CSI-RS positions for the receive RRH group and the muting positions for the interference measurement set are not overlapped with each other.

(ii) When the muting position for the interference measurement set and the CSI-RS position notified by the eNB are overlapped partially, the UE assumes that the CSI-RS is transmitted the overlapped position so as to measure interference on the resource at the position where the CSI-RS is not overlapped.

In method (ii), if it is notified that the interference measurement resource and the CSI-RS transmission resource for the receive RRH group overlap with each other, the UE measures interference on the interference measurement resource which is not overlapped with the CSI-RS transmission resource by giving priority to the CSI-RS without additional notification.

The CSI-RS and muting methods can be used for measuring inter-cell and intra-cell interference in a DAS-based communication system. In the DAS-based communication system operating with either the CSI-RS or muting method, the interference measurement set and information related thereto may not be notified to the UE. That is, no separate radio resource for interference measurement is allocated. Although the CSI-RS or muting method is applied to a mobile communication system, if the necessary information is not notified to the UE concerning interference measurement, the UE regards that there is no intra-cell interference so as to measure interference based on only the CRS as shown in FIG. 5.

The UE measures interference only with CRS when the interference measurement set is not configured because no interference measurement set notification is interpreted as the system is not configured based on DAS. Since the intra-cell interference does not exist in the non-DAS communication system, it is sufficient to measure only the inter-cell interference based on the CRS. The interference measurement set configuration and related operations can be briefly summed up as follows.
1. With the interference measurement set configuration, the UE measures interference according to the first or second embodiment which is supported by the system. When using the first embodiment, the inter-cell interference is measured based on the CRS.
2. Without the interference measurement set configuration, the UE measures only the inter-cell interference based on the CRS.

Figure 8:
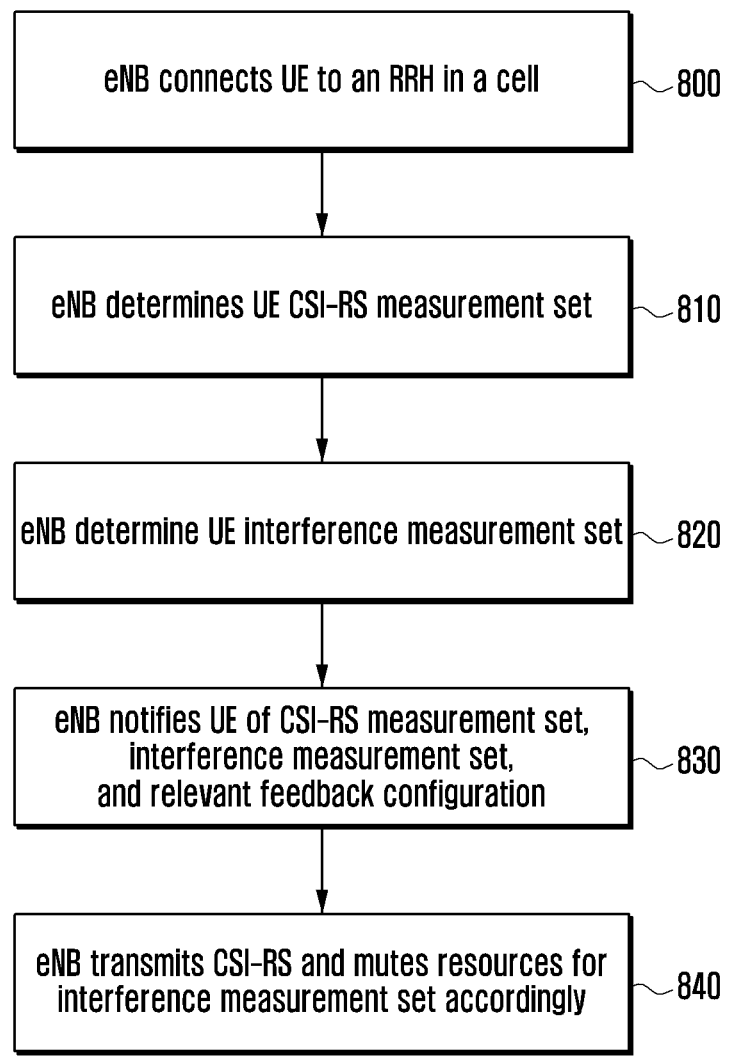
FIG. 8 illustrates an eNB procedure for interference measurement in the DAS-based communication system according to an embodiment of the present invention.

FIG. 8 illustrates an eNB procedure for interference measurement in the DAS-based communication system according to an embodiment of the present invention.

In FIG. 8, the eNB determines a receive RRH group of the UE at step 800, and one or more receive RRH groups can be selected. After determining the receive RRH group at step 800, the eNB determines CSI-RS for measuring the strength of the signal transmitted through the receive RRH group at step 810. One CSI-RS is determined per receive RRH group determined at step 800. In order to measure interference, the eNB determines the radio resource (or interference measurement information), per receive RRH group, on which interference is measured at step 820. The interference measurement information may be configuration of CSI-RS transmitted through adjacent antenna groups as described in the CSI-RS method or a specific muting pattern as described in the muting method.

The eNB notifies the UE of a method for feedback of the received signal strength of CSI-RS transmitted through the receive RRH antenna (CSI-RS measurement set), interference measurement set, and measured interference information to the eNB at step 830. According to an embodiment of the present invention, the eNB can notify the UE of the above information through higher layer signaling. The eNB then performs CSI-RS transmission or muting the CSI-RS transmission as notified to the UE at step 840.

Figure 9:
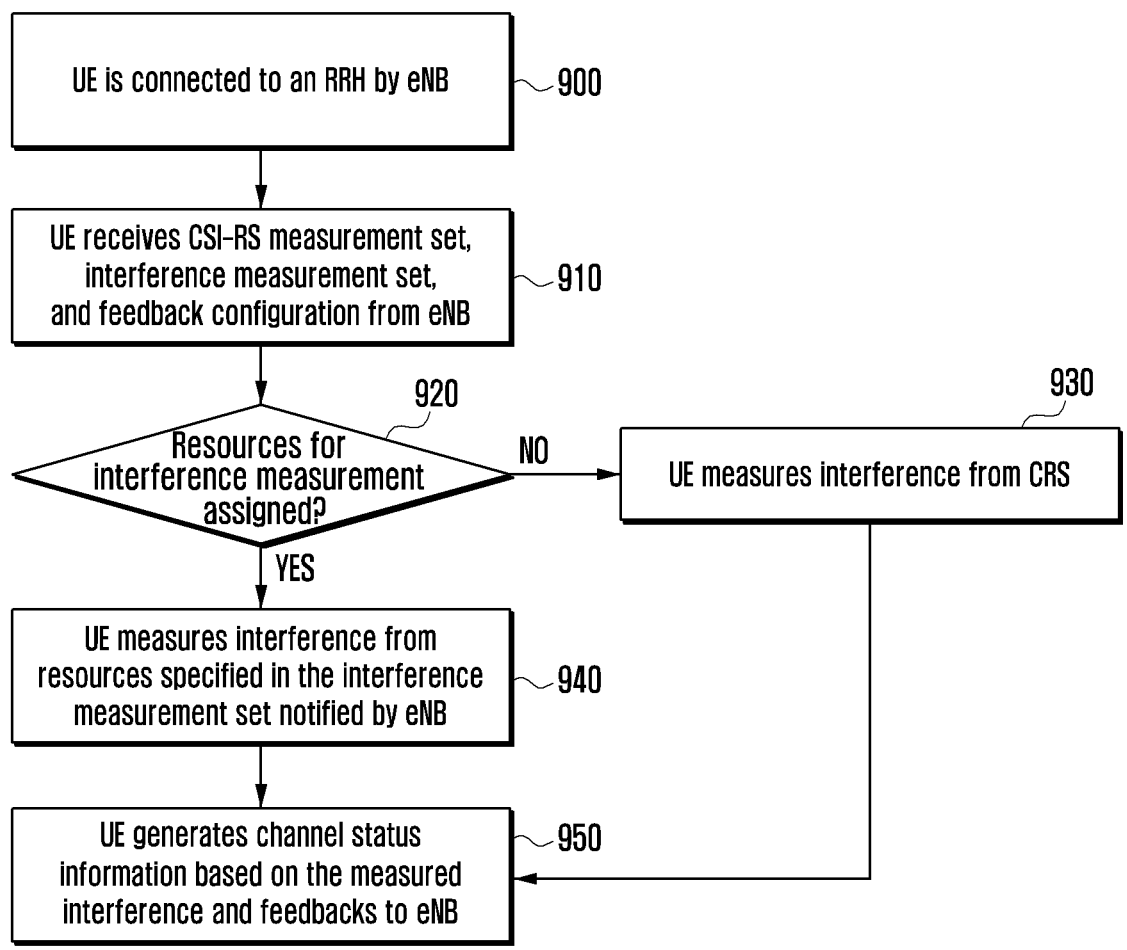
FIG. 9 illustrates a UE procedure for interference measurement in the DAS-based communication system according to an embodiment of the present invention.

FIG. 9 illustrates a UE procedure for interference measurement in the DAS-based communication system according to an embodiment of the present invention.

In FIG. 9, the UE receives the information on the method for feedback of the received signal strength of CSI-RS transmitted through the receive RRH antenna (CSI-RS measurement set), interference measurement set, and measured interference information feedback at step 910.

The UE determines whether an interference measurement set is indicated at step at step 920, and if not indicated, the UE measures interference based on only the CRS at step 930. Otherwise, if an interference measurement set is indicated at step 920, the UE measures interference on the resource indicated in the interference measurement set (interference measurement information) at step 940, where the radio resource configured for interference measurement can be configuration of CSI-RS assigned for the RRH group according to the CSI-RS method or the muting pattern according to the muting method. After measuring interference at step 930 or 940, the UE generates channel status information based on the CSI-RS received through the receive RRH group and the measured interference amount and reports the channel status information to the eNB.

Figure 10:
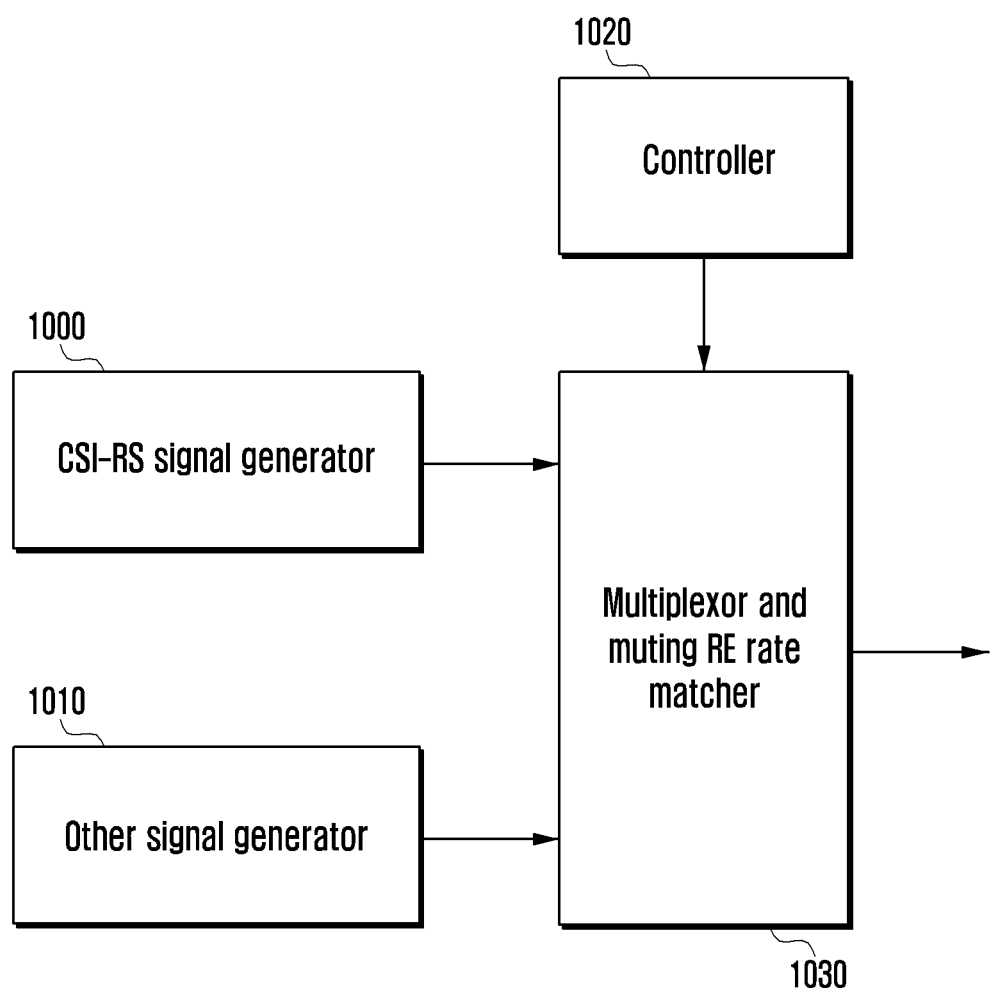
FIG. 10 illustrates a configuration of the eNB for interference measurement according to an embodiment of the present invention.

FIG. 10 illustrates a configuration of the eNB for interference measurement according to an embodiment of the present invention.

In FIG. 10, the controller 1020 of the eNB controls the CSI-RS generator 1000 to generate CSI-RS for the UE to measure the received signal strength per RRH group. The CSI-RS is assigned to the respective RRH groups so as to be multiplexed, by the multiplexer muting RE rate matcher 1030, with other signals generated by the other signal generator 1010 and then transmitted to the UE through a radio communication unit (not shown).

Specifically, the eNB controller 1020 determines at least one receive RRH group per UE and CSI-RS for measurement of signal strength transmitted through the receive RRH group. The eNB controller 1020 determines interference measurement information for use in measuring at least one of inter-cell interference and intra-cell interference in association with the receive RRH group and controls notification of the signal strength of CSI-RS and interference measurement information to the UE. In this case, the eNB controller 1020 may control such that the above information is notified to the UE through higher layer signaling. The eNB controller 1020 may detect the receipt of the information on the interference measured by the UE based on the interference measurement information.

According to the CSI-RS method of the present invention, the interference measurement information can be the RRH group information (interference measurement set) on the RRH groups causing intra-cell interference and information required for receiving CSI-RS per RRH group in the interference measurement set. In this case, the interference measurement set is configured per RRH group.

According to the muting method of the present invention, the interference measurement information can be the muting pattern for measuring the intra-cell interference and inter-cell interference. The muting pattern may be configured for the respective receive RRH groups per UE.

In order to avoid measurement of the signal transmitted through the receive RRH group in which the UE is measuring interference, the CSI-RS REs and muting pattern REs are configured not to overlap each other. When the CSI-RS REs and the muting pattern REs partially overlap each other, the interference measurement is performed on the REs on which the CSI-RS is not transmitted.

Figure 11:
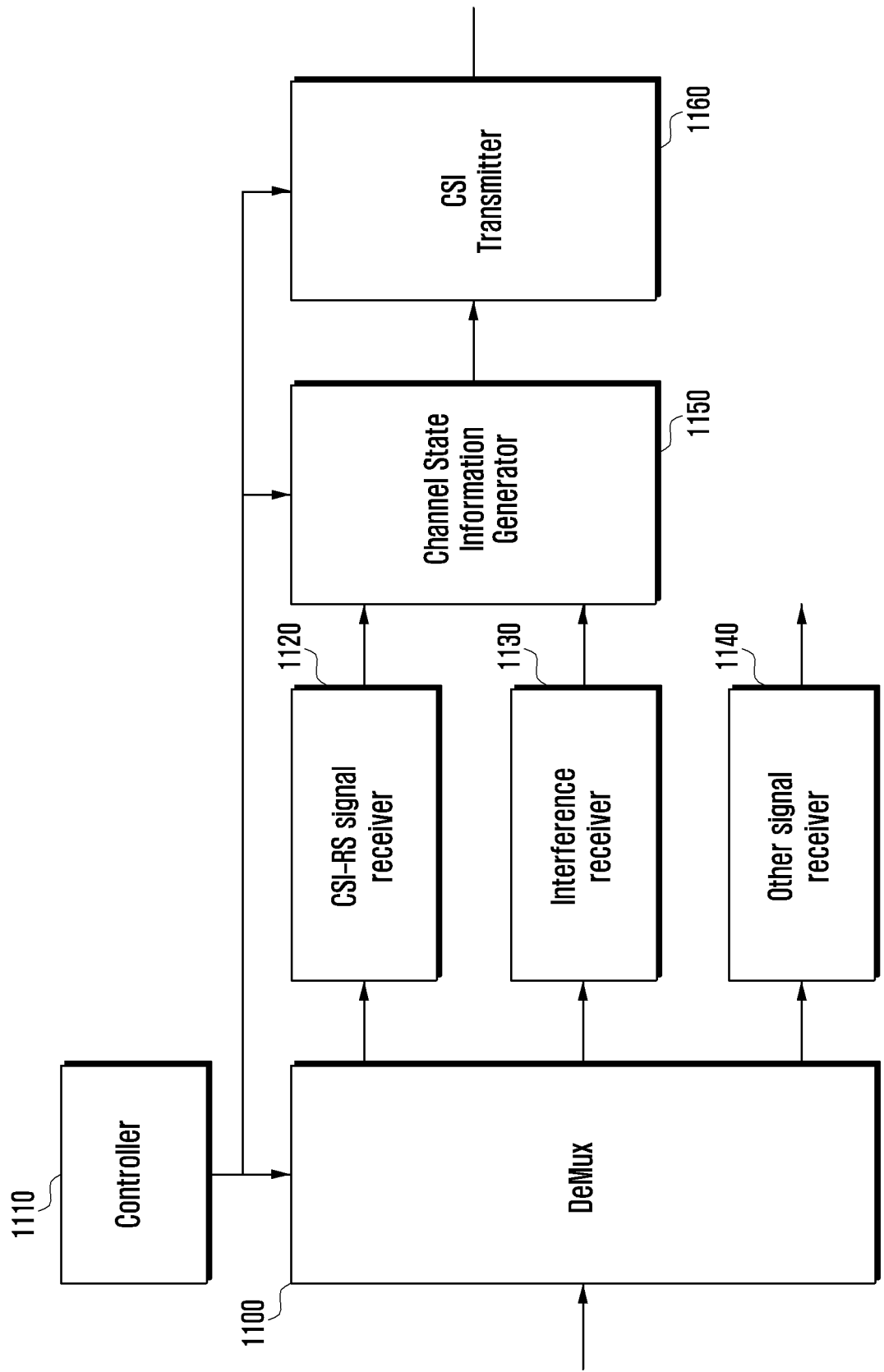
FIG. 11 illustrates a configuration of the UE for interference measurement according to an embodiment of the present invention.

FIG. 11 illustrates a configuration of the UE for interference measurement according to an embodiment of the present invention.

In FIG. 11, the controller 1110 controls such that the UE receives interference measurement information from the eNB, measures interference based on the interference measurement information, and generates channel status information using the measured interference.

Specifically, the controller 1110 controls a radio communication unit (not shown) to receive the interference measurement information required for measuring at least one of inter-cell and intra-cell interferences in association with the receive RRH group of the UE from the eNB. The controller 1110 controls to measure the interference based on the interference measurement information, generate channel status information using the measured interference, and transmit the channel status information to the eNB.

According to the CSI-RS method of the present invention, the interference measurement information includes the interference measurement set of RRH groups causing intra-cell interference to the UE and the information required for receiving CSI-RS transmitted through the respective RRH groups in the interference measurement set. The interference measurement set is configured for each of the multiple receive RRH groups of UE.

According to the muting method of the present invention, the interference measurement information can be the muting pattern for measuring the intra-cell interference and inter-cell interference. The muting pattern may be configured for the respective receive RRH groups per UE.

In order to avoid measurement of the signal transmitted through the receive RRH group in which the UE is measuring interference, the CSI-RS REs and muting pattern REs are configured not to overlap each other. When the CSI-RS REs and the muting pattern REs partially overlap each other, the interference measurement is performed on the REs on which the CSI-RS is not transmitted.

Although the description is directed to when the controller 1110 of the UE controls overall interference measurement procedure, a separate function block may perform the interference measurement.

For this purpose, the controller 1110 inputs the radio signal received from the eNB to the demultiplexer 1110, which demultiplexes the signal into CSI-RS transmitted through the receive RRH group, interference measurement signal, and other signals. The CSI-RS transmitted through the receive RRH group is input to the CSI-RS receiver 1120 so as to be used for measuring the received signal strength.

Meanwhile, the interference measurement signal is input to the interference receiver 1130 so as to be used for determining the interference amount and characteristic. The CSI-RS receiver 1120 and the interference receiver 1130 input the received signal strength and interference-related information to the channel status information generator 1150 so as to be used for generating the channel status information to the eNB based on the feedback-related information. The channel status information generated by the channel status information generator 1150 is input to the channel status information transmitter 1160 so as to be transmitted to the eNB.

As described above, the interference measurement method of the present invention is capable of measuring inter-cell interference and intra-cell interference efficiently in the DAS-based communication system.

Although embodiments of the present invention have been described in detail hereinabove with specific terminology, the present invention is not limited thereto, and it will be obvious to those skilled in the art that various other changes and modifications can be made without departing from the spirit and scope of the invention.

What is claimed is:

1. A method of a base station in a wireless communication system, the method comprising:
transmitting first configuration information for a channel measurement and second configuration information for an interference measurement, wherein the first configuration information indicates a first non-zero power channel state information reference signal (NZP CSI-RS) resource for the channel measurement and the second configuration information indicates a second NZP CSI-RS resource for the interference measurement;
transmitting a first NZP CSI-RS associated with the first NZP CSI-RS resource;
transmitting a second NZP CSI-RS associated with the second NZP CSI-RS resource; and
receiving channel state information associated with a channel based on the first configuration information and an interference based on the second configuration information,
wherein the first configuration information indicates the first NZP CSI-RS resource among a plurality of configured NZP CSI-RS resources, and the second configuration information indicates the second NZP CSI-RS resource among the plurality of configured NZP CSI-RS resources,
wherein the interference associated with the second NZP CSI-RS resource corresponds to the second NZP CSI-RS, and
wherein the interference is identified considering a received power of the second NZP CSI-RS associated with the second NZP CSI-RS resource.

2. The method of claim 1, further comprising:
transmitting third configuration information for the interference measurement,
wherein the third configuration information indicates a resource for the interference measurement.

3. The method of claim 1, wherein at least one resource element (RE) for the first NZP CSI-RS resource and at least one RE for a zero power (ZP) CSI-RS resource are overlapped, and
wherein the first NZP CSI-RS is transmitted on the overlapped resource.

4. The method of claim 1, wherein the second configuration information indicates a number of antenna ports of the second NZP CSI-RS resource and a transmission position of the second NZP CSI-RS resource.

5. A method of a terminal in a wireless communication system, the method comprising:
receiving first configuration information for a channel measurement and second configuration information for an interference measurement, wherein the first configuration information indicates a first non-zero power channel state information reference signal (NZP CSI-RS) resource for the channel measurement and the second configuration information indicates a second NZP CSI-RS resource for the interference measurement;
receiving a first NZP CSI-RS associated with the first NZP CSI-RS resource;
receiving a second NZP CSI-RS associated with the second NZP CSI-RS resource;
obtaining channel state information based on a measured channel associated with the first configuration information and a measured interference associated with the second configuration information; and
transmitting the obtained channel state information,
wherein the first configuration information indicates the first NZP CSI-RS resource among a plurality of configured NZP CSI-RS resources and the second configuration information indicates the second NZP CSI-RS resource among the plurality of configured NZP CSI-RS resources,
wherein the interference associated with the second NZP CSI-RS resource corresponds to the second NZP CSI-RS, and
wherein the interference is identified considering a received power of the second NZP CSI-RS associated with the second NZP CSI-RS resource.

6. The method of claim 5, further comprising:
receiving third configuration information for the interference measurement, wherein the third configuration information indicates a resource for the interference measurement.

7. The method of claim 5, wherein at least one resource element (RE) for the first NZP CSI-RS resource and at least one RE for a zero power (ZP) CSI-RS resource are overlapped, and
wherein the first NZP CSI-RS is transmitted on the overlapped resource.

8. The method of claim 5, wherein the second configuration information indicates a number of antenna ports of the second NZP CSI-RS resource and a transmission position of the second NZP CSI-RS resource.

9. A base station in a wireless communication system, the base station comprising:
a transceiver; and
a controller coupled with the transceiver and configured to:
transmit first configuration information for a channel measurement and second configuration information for an interference measurement, wherein the first configuration information indicates a first non-zero power channel state information reference signal (NZP CSI-RS) resource for the channel measurement and the second configuration information indicates a second NZP CSI-RS resource for the interference measurement,
transmit a first NZP CSI-RS associated with the first NZP CSI-RS resource,
transmit a second NZP CSI-RS associated with the second NZP CSI-RS resource, and
receive channel state information associated with a channel based on the first configuration information and an interference based on the second configuration information,
wherein the first configuration information indicates the first NZP CSI-RS resource among a plurality of configured NZP CSI-RS resources and the second configuration information indicates the second NZP CSI-RS resource among the plurality of configured NZP CSI-RS resources,
wherein the interference associated with the second NZP CSI-RS resource corresponds to the second NZP CSI-RS, and
wherein the interference is identified considering a received power of the second NZP CSI-RS associated with the second NZP CSI-RS resource.

10. The base station of claim 9, wherein the controller is further configured to transmit third configuration information for the interference measurement, and
wherein the third configuration information indicates a resource for the interference measurement.

11. The base station of claim 9, wherein at least one resource element (RE) for the first NZP CSI-RS resource and at least one RE for a zero power (ZP) CSI-RS resource are overlapped, and
wherein the first NZP CSI-RS is transmitted on the overlapped resource.

12. The base station of claim 9, wherein the second configuration information indicates a number of antenna ports of the second NZP CSI-RS resource and a transmission position of the second NZP CSI-RS resource.

13. A terminal in a wireless communication system, the terminal comprising:
a transceiver; and
a controller coupled with the transceiver and configured to:
receive first configuration information for a channel measurement and second configuration information for an interference measurement, wherein the first configuration information indicates a first non-zero power channel state information reference signal (NZP CSI-RS) resource for the channel measurement and the second configuration information indicates a second NZP CSI-RS resource for the interference measurement,
receive a first NZP CSI-RS associated with the first NZP CSI-RS resource,
receive a second NZP CSI-RS associated with the second NZP CSI-RS resource,
obtain channel state information based on a measured channel associated with the first configuration information and a measured interference associated with the second configuration information, and
transmit the obtained channel state information,
wherein the first configuration information indicates the first NZP CSI-RS resource among a plurality of configured NZP CSI-RS resources and the second configuration information indicates the second NZP CSI-RS resource among the plurality of configured NZP CSI-RS resources,
wherein the interference associated with the second NZP CSI-RS resource corresponds to the second NZP CSI-RS, and
wherein the interference is identified considering a received power of the second NZP CSI-RS associated with the second NZP CSI-RS resource.

14. The terminal of claim 13, wherein the controller is further configured to receive third configuration information for the interference measurement, and
wherein the third configuration information indicates a resource for the interference measurement.

15. The terminal of claim 14, wherein at least one resource element (RE) for the first NZP CSI-RS resource and at least one RE for a zero power (ZP) CSI-RS resource are overlapped, and
wherein the first NZP CSI-RS is transmitted on the overlapped resource.

16. The terminal of claim 13, wherein the second configuration information indicates a number of antenna ports of the second NZP CSI-RS resource and a transmission position of the second NZP CSI-RS resource.

* * * * *